United States Patent
Walton et al.

(10) Patent No.: US 8,632,287 B2
(45) Date of Patent: Jan. 21, 2014

(54) FASTENER RETAINER

(75) Inventors: Larry A. Walton, Milan, MI (US);
Baden Michael Powell, Tecumseh (CA);
Gurdeep Singh, Canton, MI (US);
Mohammad A. Khorrami, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/478,856

(22) Filed: May 23, 2012

(65) Prior Publication Data

US 2012/0237314 A1 Sep. 20, 2012

Related U.S. Application Data

(62) Division of application No. 12/180,224, filed on Jul. 25, 2008, now Pat. No. 8,202,030.

(51) Int. Cl.
*F16B 35/04* (2006.01)

(52) U.S. Cl.
USPC .......................... 411/107; 411/970; 411/999

(58) Field of Classification Search
USPC ......... 411/107, 113, 119–121, 965, 970, 984, 411/999; 81/13
See application file for complete search history.

(56) References Cited

U.S. PATENT DOCUMENTS

| | | | |
|---|---|---|---|
| 484,745 A | 10/1892 | Pugh | |
| 785,919 A | 3/1905 | Robertson | |
| 2,303,148 A | 11/1942 | Tinnerman | |
| 2,360,424 A | 10/1944 | Kauffman | |
| 2,370,944 A | 3/1945 | Emerson | |
| 2,390,838 A | 12/1945 | Johnson | |
| 2,472,394 A | 6/1949 | Barraket | |
| 2,571,786 A * | 10/1951 | Tinnerman | 411/112 |
| 2,605,806 A | 8/1952 | Tinnerman | |
| 3,116,776 A | 1/1964 | Flora | |
| 3,373,789 A | 3/1968 | Parkin et al. | |
| 3,451,668 A | 6/1969 | Robinson | |
| 3,782,437 A | 1/1974 | Seckerson | |
| 3,986,544 A | 10/1976 | Jones et al. | |
| 4,953,680 A * | 9/1990 | Flotow et al. | 192/111.6 |
| 5,080,546 A | 1/1992 | Purvin et al. | |
| 5,190,423 A | 3/1993 | Ewing | |
| 6,027,293 A * | 2/2000 | Beemer et al. | 411/119 |
| 6,637,993 B2 | 10/2003 | Murakami | |
| 7,096,845 B1 | 8/2006 | Vaandrager et al. | |
| 2010/0021262 A1 | 1/2010 | Walton et al. | |

* cited by examiner

*Primary Examiner* — Flemming Saether

(57) ABSTRACT

A fastener retainer is provided capable of retaining a fastener to a part prior to and during assembly. A first portion engages a fastener flange while leaving a fastener head exposed for assembly tool access. A second portion has flanges that engage the edges of the part.

22 Claims, 2 Drawing Sheets

FASTENER RETAINER

CROSS-REFERENCE TO RELATED APPLICATION

This application is a divisional of U.S. patent application Ser. No. 12/180,224 filed on Jul. 25, 2008. The disclosure of the above application is incorporated herein by reference.

FIELD

The present invention relates generally to a fastener retainer and more particularly to a fastener retainer used to secure a fastener to a part during assembly and disassembly of the part to another part.

BACKGROUND

The statements in this section merely provide background information related to the present disclosure and may or may not constitute prior art.

Many assembly operations use fasteners, such as bolts or screws, to couple two separate parts together. In many assembly operations it is desirable to retain the fastener to one of the parts to be joined prior to assembly or joining of the two parts in order to more quickly and efficiently couple the parts together. Securing the fastener to one of the parts prior to joining of the parts also improves quality control by assuring a fastener is employed and also eliminates the potential for loose fasteners to fall into assemblies during installation. Additionally, securing the fastener to the part removes the fastener from the assembly, inventory, and shipping process.

One solution known in the art for securing a fastener to a part includes using a keeper that engages the threaded portion of the bolt. However, it is possible for the bolt to unscrew, either during shipment of the part or during disassembly of the part during routine maintenance. Moreover, typical keepers require modifications to the joining parts in order to account for the thickness of the keeper on the threaded portion. Another solution to securing a fastener to a part is described in commonly assigned U.S. Pat. No. 7,096,845 issued to Gary Vaandrager, et al. In Vaandrager, a bracket is used to secure a specialized captured nut to a part. While useful for its intended purpose, there is room in the art for a fastener retainer operable to secure a standard bolt or other fastener to a part that does not interfere with the thread of the bolt, does not require alterations to the part, and that is effective and inexpensive.

SUMMARY

A fastener retention device is provided having at least one part-retention flange, a bolt head or nut retention flange and at least one connecting flange.

An embodiment of the device for retaining a fastener in an aperture of a part includes a first portion having a hole extending therethrough, wherein the hole has a dimension smaller than a dimension of the flange of the fastener, a second portion having a first member configured to couple the device to the part, and a first arm connected at one end to the first portion and connected at an opposite end to the second portion. The fastener is at least partially located within the aperture and the flange of the fastener is located between the part and the first portion and the fastener is prevented from being completely removed from the part by the first portion.

In one aspect of the present invention, the first portion is a flat ring that defines the hole.

In another aspect of the present invention, the second portion includes a second member. The first and second members extend perpendicularly from the end of the first arm opposite the end of the first arm connected to the first portion. The first and second members are at least partially bent at ends thereof to grip a pair of sides of the part.

In yet another aspect of the present invention, the first and second members are substantially parallel to the first portion.

In yet another aspect of the present invention, the first arm is angled with respect to both the first portion and the second portion such that the first portion is located on a plane different than the second portion.

In yet another aspect of the present invention, a second arm is connected at one end of the first portion.

In yet another aspect of the present invention, the first arm and the second arm are bendable and act as springs to allow the first portion to move relative to the fastener and the part.

In yet another aspect of the present invention, the second arm is at least partially angled with respect to the first portion such that an end of the second arm opposite the end connected to the first portion is positioned above the first portion.

In yet another aspect of the present invention, a third portion is connected to the second arm at an end opposite the end connected to the first portion. The second arm is angled with respect to the first portion such that the third portion is on the same plane as the second portion.

In yet another aspect of the present invention, the third portion includes a third and fourth members that extend perpendicularly from the end of the second arm opposite the end of the second arm connected to the first portion. The third and fourth members are at least partially bent at ends thereof to grip a pair of sides of the part. The third and fourth members are substantially parallel to the first portion.

In yet another aspect of the present invention, the second arm is connected to the first portion directly opposite where the first arm is connected to the first portion.

In yet another aspect of the present invention, the second arm is connected to the first portion at an angle with respect to the first arm.

In yet another aspect of the present invention, the third and fourth members each have a length that is shorter than a length of the first member.

An embodiment of the fastener retainer assembly located on a part includes a fastener and a fastener retainer. The fastener has a first end portion at least partially located within the part, a second end portion located at least partially outside the part, and a radial flange located between the first end portion and the second end portion and in contact with the part, wherein the flange has a dimension that is greater than a dimension of the head and a dimension of the shank. The fastener retainer includes a first portion having a hole extending therethrough, wherein the hole has a dimension that is smaller than the dimension of the flange, a second portion having a first member configured to couple the fastener retainer to the part, and a first arm connected at one end to the first portion and connected at an opposite end to the second portion, the first arm angled with respect to both the first portion and the second portion such that the first portion is located above the flange of the fastener and the hole is aligned with the head. The flange contacts the first portion of the fastener retainer when the first end portion is still at least partially located within the part thereby preventing the fastener from being completely removed from the part.

In one aspect of the fastener retainer assembly, the first portion is a flat ring that defines the hole.

In another aspect of the fastener retainer assembly, the second portion includes a second member. The first and second members extend perpendicularly from the end of the first arm opposite the end of the first arm connected to the first portion. The first and second members are at least partially bent at ends thereof to grip a pair of sides of the part.

In another aspect of the fastener retainer assembly, the first and second members are substantially parallel to the first portion.

In another aspect of the fastener retainer assembly, the first arm is angled with respect to both the first portion and the second portion such that the first portion is located on a plane different than the second portion.

In another aspect of the fastener retainer assembly, a second arm is connected at one end thereof to the first portion.

In another aspect of the fastener retainer assembly, the first and second arms are bendable and act as springs to allow the first portion to move relative to the fastener and the part.

In another aspect of the fastener retainer assembly, the second arm is at least partially angled with respect to the first portion such that an end of the second arm opposite the end connected to the first portion is positioned above the first portion.

In another aspect of the fastener retainer assembly, a third portion connected to the second arm at an end opposite the end connected to the first portion. The third portion is configured to engage the part. The second arm is angled with respect to the first portion such that the third portion is on the same plane as the second portion.

In another aspect of the fastener retainer assembly, the third portion includes a third and fourth member that extend perpendicularly from the end of the second arm opposite the end of the second arm connected to the first portion. The third and fourth members are at least partially bent at ends thereof to grip a pair of sides of the part.

In another aspect of the fastener retainer assembly, the second arm is connected to the first portion directly opposite where the first arm is connected to the first portion.

In another aspect of the fastener retainer assembly, the second arm is connected to the first portion at an angle with respect to the first arm.

In another aspect of the fastener retainer assembly, the third and fourth members each have a length that is shorter than a length of the first member.

Further objects, aspects and advantages of the present invention will become apparent by reference to the following description and appended drawings wherein like reference numbers refer to the same member, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
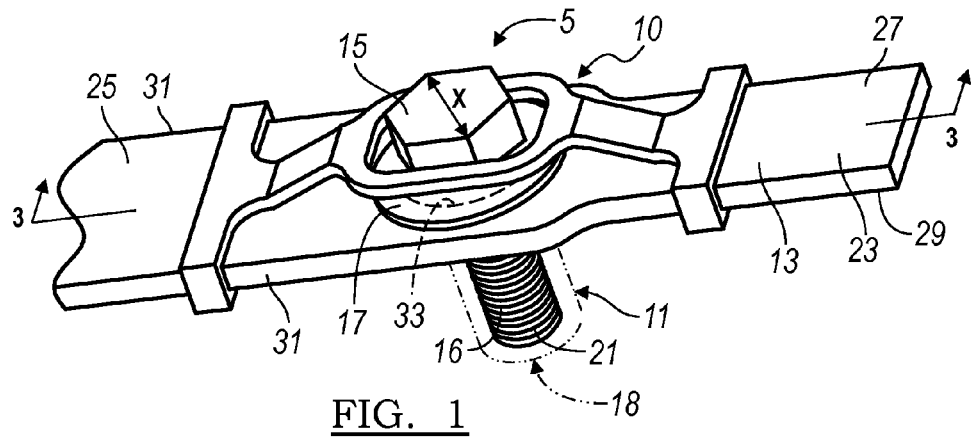
FIG. 1 is a perspective view of an assembly illustrating an exemplary fastener secured to an exemplary part using a fastener retainer according to the principles of the present invention.

Referring to FIG. 1, a plan view of a fastener retainer assembly according to the principles of the present invention is generally indicated by reference number 5. The fastener retainer assembly 5 generally includes a fastener retainer 10 and a fastener 11 secured to an exemplary part 13. The fastener retainer 10 is employed to retain or secure the fastener 11 to the part 13, as will be described in greater detail below. The fastener 11 is preferably a standard bolt or similar fastener having a first end portion or shank 16 located on one side of a flange 17 and a second end portion or head 15 extending from a side of the flange 17 opposite the shank 16. The flange 17 extends radially outward from the head 15 and the shank 16. A plurality of threads 21 are located on the shank 16. It should be appreciated that various other types of fasteners 11 generally having head, flange, and shank portions may be employed with the present invention without departing from the scope of the present invention. Alternatively, the fastener 11 may have a captured washer in place of the flange 17 without departing from the scope of the present invention. The fastener 11 is used to secure the part 13 to another separate part or member 18 using a nut (not shown) threaded onto the threads 21. The part 13 in the embodiment provided is a detent spring and roller assembly and the part 18 is part of a transmission case or housing. However, it should be appreciated that the parts 13, 18 may take various forms without departing from the scope of the present invention. The part 13 generally includes a first portion 23, a second portion 25, a top side 27, a bottom side 29, and side walls 31. Moreover, the part 13 includes an aperture 33 located between the first and second portions 23, 25 that extends between the top side 27 and the bottom side 29. The aperture 33 is a fastener hole sized to receive the fastener 11 therein, as will be described in greater detail below. In the example provided, the second portion 25 has a width greater than a width of the first portion 23, though the widths may be equal without departing from the scope of the present invention.

Figure 2:
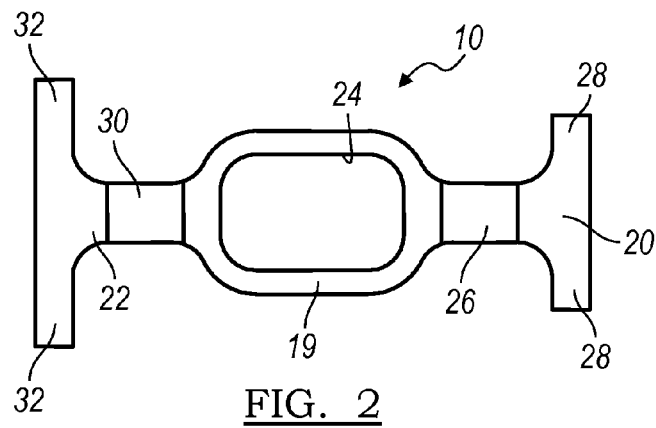
FIG. 2 is a plan view of the fastener retainer according to the principles of the present invention.
Figure 3:
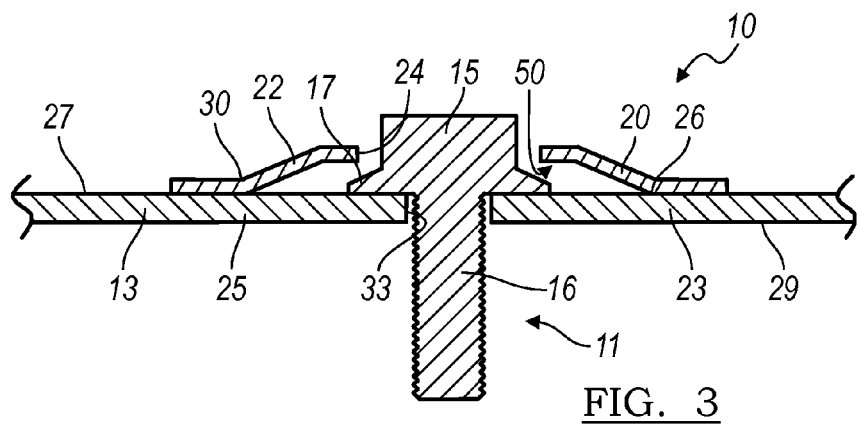
FIG. 3 is a cross-sectional view of the fastener retainer, fastener, and part shown in FIG. 1 taken in the direction of arrow 3-3.

With reference to FIG. 2, the fastener retainer 10 will now be described in greater detail. The fastener retainer 10 includes an annular portion 19, a first connector portion 20, and a second connector portion 22. The annular portion 19 is a flat ring that includes a hole 24 extending therethrough. The hole 24 has a width or diameter "X". The width X is greater than a width or diameter of the head 15 of the fastener 11 but less than a width or diameter of the flange 17. The first connector portion 20 includes a first arm 26 and a pair of first flanges 28. The first arm 26 is connected at one end thereof to the annular portion 19 and connected at an opposite end to the first flanges 28. The first arm 26 is angled with respect to the annular portion 19 and the first flanges 28 so that the first flanges 28 are located on a separate plane from the annular portion 19, as best seen in FIGS. 1 and 3. The first flanges 28 extend perpendicularly from opposite sides of the first arm 24 to form an approximately a "T" shape. The first flanges 28 are operable to engage the part 13, as will be described in greater detail below. The second connector portion 22 is substantially similar to the first connector portion 20 and is located on a side of the annular ring 19 opposite the first connector portion 20. The second connector portion 22 includes a second arm 30 and a pair of second flanges 32. The second arm 30 is connected at one end thereof to the annular portion 19 and connected at an opposite end to the second flanges 32. The second arm 30 is angled with respect to the annular portion 19 and the second flanges 32 so that the second flanges 32 are located on the same plane as the first flanges 28, as best seen in FIGS. 1 and 3. The second flanges 32 extend perpendicularly from opposite sides of the second arm 30 to form an approximately a "T" shape. The second flanges 32 are operable to engage the part 13, as will be described in greater detail below. Moreover, the second flanges 32 preferably have a length greater than a length of the first flanges 28. However, it should be appreciated that the flanges 28, 32 may have equal lengths without departing from the scope of the present invention. The fastener retainer 10 is preferably formed as a stamped, steel unitary piece. However, other materials and methods of manufacture may be employed without departing from the scope of the invention.

Turning now to FIG. 3, and with continued reference to FIGS. 1 and 2, the assembly of the fastener retainer 10 and fastener 11 to the part 13 will be described in greater detail. First, the fastener 11 is inserted into the aperture 33 of the part 13 such that the shank 16 extends through the aperture 33 and the flange 17 abuts the top surface 27 of the part 13. In this condition, the fastener 11 is not secured to the part 13 and may fall out when the part 13 is coupled to the member 18. The fastener retainer 10, as noted above, is employed to retain the fastener 11 to the part 13 prior to installation of the part 13 to the member 18. Accordingly, the fastener retainer 10 is positioned such that the head 15 of the fastener 11 extends through the hole 24 located in the fastener retainer 10. The first portion 20 of the fastener retainer 10 is positioned over the first portion 23 of the part 13 and the second portion 22 of the fastener retainer 10 is positioned over the second portion 25. The flanges 28, 32 are crimped and bent such that each of the flanges 28, 32 extend around the sides 31 of the part 13 to the bottom surface 29. In this way, the flanges 28, 32 grip the part 13 and secure the fastener retainer 10 to the part 13.

As noted above, the fastener retainer 10 is disposed on the part 13 such that the head 15 of the fastener 11 protrudes through the aperture 24 of the fastener retainer 10. The head 15 is unimpeded by the fastener retainer 10 thereby allowing the head 15 to be engaged by a drive tool or socket (not shown). The flange 17 of the fastener 11 is disposed between the annular portion 19 of the fastener retainer 10 and the part 13. Because the flange 17 has a width or diameter greater than the width or diameter X of the hole 24 of the fastener retainer 10, the annular portion 19 of the fastener retainer 10 captures the flange 17 between the annular portion 19 and the part 13. Accordingly, the fastener 11 is prevented from fully separating from the part 13 since the fastener 11 is restrained by the part 13 and the fastener retainer 10. More specifically, when the fastener 11 loosened from the part 13, the fastener 11 may move such that the flange 17 no longer abuts the top surface 27 of the part 13. As the fastener 11 moves away from the part 13, the head 15 is able to pass through the hole 24. However, the flange 17, having a larger dimension than the hole 24, will not pass through the hole 24 and instead contact the annular portion 19. This contact occurs as the shank 13 is still located within the aperture 33 of the part 13, thereby preventing the fastener 11 from totally withdrawing from the aperture 33 of the part 13. Alternatively, the annular portion 19 contacts the flange 17 while the flange 17 abuts the top surface 27 of the part 13 thereby preventing the shank of the fastener 11 from being removed from the aperture 33 of the part 13.

In general, a significant benefit of the fastener retainer 10 is that the fastener retainer 10 does not interfere with the rundown and torque operation on the fastener 11. For example, when the fastener 11 is tightened such that the flange 17 is flush with the top surface 27 of the part 13, the annular portion 19 is supported above the head 15 by the angled arms 26, 30 of the fastener retainer 10, thereby forming a gap 50 between the fastener 11 and the fastener retainer 10. The gap 50 allows the fastener 11 to be tightened to specific torque limits without physical interference from the fastener retainer 10. Finally, the arms 26, 30 act as a spring for the annular portion 19 such that the annular portion 19 may be compressed down towards the part 13 by a drive tool or socket when the fastener 11 is being tightened. In an alternative embodiment, the annular portion 19 contacts the flange 17 while the fastener 11 is being tightened so long as the fastener retainer 10 does not interfere with the rundown and torque operation achieving proper torque on the fastener 11.

Figure 4:
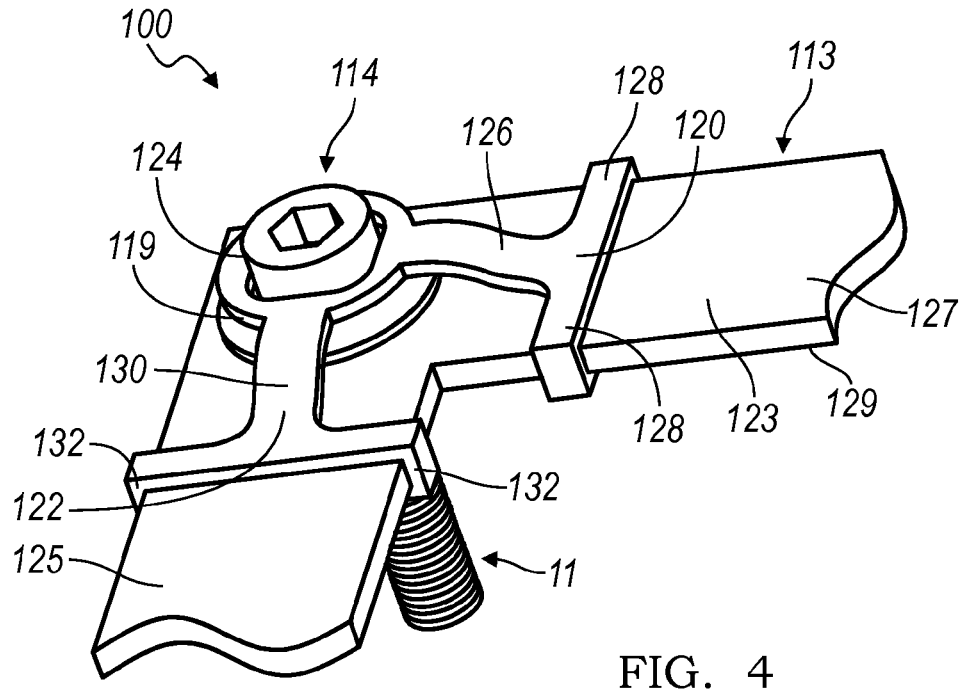
FIG. 4 is a perspective view of another embodiment of a fastener retainer for securing an exemplary fastener on an exemplary part according to the principles of the present invention.

Referring to FIG. 4, a perspective view of another embodiment of a fastener retainer assembly is generally indicated by reference number 100. The fastener retainer assembly 100 includes the fastener 11, an exemplary part 113, and a fastener retainer 114. The part 113 is similar to the part 13 shown in FIGS. 1-3, having a first portion 123, a second portion 125, a top side 127, a bottom side 129, and side walls 131. However, in part 113 the first portion 123 is angled with respect to the second portion 125, forming a corner or "L" shape.

The fastener retainer 114 includes an annular portion 119, a first connector portion 120, and a second connector portion 122. The annular portion 119 includes a hole 124 extending therethrough. The first connector portion 120 includes a first arm 126 and a pair of first flanges 128. The first arm 126 is connected at one end thereof to the annular portion 119 and connected at an opposite end to the first flanges 128. The first arm 126 is angled with respect to the annular portion 119 and the first flanges 128 so that the first flanges 128 are located on a separate plane from the annular portion 119, as best seen in FIGS. 1 and 3. The first flanges 128 extend perpendicularly from opposite sides of the first arm 124 to form an approximately a "T" shape. The first flanges 128 are operable to engage the part 113 in the same manner as described above for the embodiment of the invention shown in FIGS. 1-3. The second connector portion 122 is substantially similar to the first connector portion 120 and is located on a side of the annular ring 119 at an angle equal to the angle created by the first portion 123 and the second portion 125 of the part 113. The second connector portion 122 includes a second arm 130 and a pair of second flanges 132. The second arm 130 is connected at one end thereof to the annular portion 119 and connected at an opposite end to the second flanges 132. The second arm 130 is angled with respect to the annular portion 119 and the second flanges 132 so that the second flanges 132 are located on the same plane as the first flanges 128, as best seen in FIGS. 1 and 3. The second flanges 132 extend perpendicularly from opposite sides of the second arm 130 to form an approximately a "T" shape. The second flanges 132 are operable to engage the part 113, in the same manner as described above for the embodiment of the invention in FIGS. 1-3. Moreover, the second flanges 132 may have a length greater than a length of the first flanges 128. However, it should be appreciated that the flanges 128, 132 may have equal lengths without departing from the scope of the present invention. The fastener retainer 110 is assembled onto the part 113 and operates to secure the fastener 11 to the part 113 in a manner substantially similar to the fastener retainer 10 shown in FIGS. 1-3. It should be appreciated that the angle of the first connector portion 120 to the second connector portion 122 may vary so long as the angle is approximately equal to the angle of the first portion 123 of the part 113 to the second portion 125 of the part 113.

Figure 5:
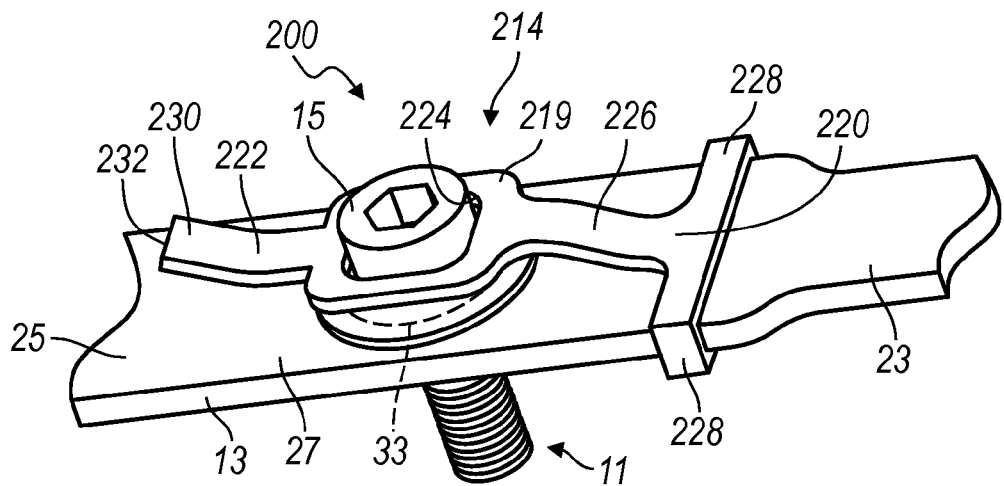
FIG. 5 is a perspective view of still another embodiment of a fastener retainer for securing an exemplary fastener on an exemplary part according to the principles of the present invention.

Referring now to FIG. 5, a perspective view of another embodiment of a fastener retainer assembly is generally indicated by reference number 200. The fastener retainer assembly 200 includes a fastener retainer 214 used to secure the fastener 11 to the part 13.

The fastener retainer 214 includes an annular portion 219, a connector portion 220, and a deflector portion 222. The annular portion 219 includes a hole 224 extending therethrough. The connector portion 220 includes a first arm 226 and a pair of first flanges 228. The first arm 226 is connected at one end thereof to the annular portion 219 and connected at an opposite end to the first flanges 228. The first arm 226 is angled with respect to the annular portion 219 and the first flanges 228 so that the first flanges 228 are located on a separate plane from the annular portion 219. The first flanges 228 extend perpendicularly from opposite sides of the first arm 224 to form an approximately a "T" shape. The first flanges 228 are operable to engage the part 13, as will be described in greater detail below. The deflector portion 222 is located on a side of the annular ring 219 opposite the connector portion 220. The deflector portion 222 includes an angled portion 230 that raises an end 232 of the deflector portion 222 above the height of the head 15 of the fastener 11.

The assembly of the fastener retainer 214 and fastener 11 to the part 13 will now be described in greater detail. First, the fastener 11 is inserted into the aperture 27 such that the shank 16 extends through the aperture 27 and the flange 17 abuts the top surface 27 of the part 13. In this condition, the fastener 11 is not secured to the part 13 and may fall out when the part 13 is coupled to another component or member (not shown) via the fastener 11. The fastener retainer 214, as noted above, is employed to retain the fastener 11 to the part 13 prior to installation of the part 13 on another component. Accordingly, the fastener retainer 214 is positioned such that the head 15 of the fastener 11 extends through the hole 224 located in the fastener retainer 214. With the flanges 228 previously crimped, the first portion 220 of the fastener retainer 214 is positioned over the first portion 23 of the part 13 where the width of the first portion 23 is narrower than the crimped flanges 228. The deflector portion 222 functions to deflect the fastener retainer 210 as the fastener retainer 210 slides from the first portion 23 of the part 13 towards the second portion 25 of the part 13. As the hole 224 of the fastener retainer 210 passes above the head 15 of the fastener 11, the annular portion 219 snaps down on the flange 17 of the fastener. In this way, the flanges 228, now on the second portion 25, grip the part 13 and secure the fastener retainer 210 to the part 13.

The head 15 of the fastener 11 protrudes through the aperture 224 of the fastener retainer 214. The head 15 is unimpeded by the fastener retainer 214 thereby allowing the head 15 to be engaged by a drive tool or socket (not shown). The flange 17 of the fastener 11 is disposed between the annular portion 219 of the fastener retainer 214 and the part 13. Because the flange 17 has a width or diameter greater than the width or diameter X of the hole 224 of the fastener retainer 214, the annular portion 219 of the fastener retainer 214 captures the flange 17 between the annular portion 219 and the part 13. Accordingly, the fastener 11 is prevented from fully separating from the part 13 since the fastener 11 is restrained by the cooperation of the part 13 and the fastener retainer 214. Moreover, when the fastener 11 is tightened such that the flange 17 is flush with the top surface 27 of the part 13, the annular portion 219 is supported above the head 15 by the angled arm 226 of the fastener retainer 214, thereby forming a gap 250 between the fastener 11 and the fastener retainer 214. The gap 250 allows the fastener 11 to be tightened to specific torque limits without physical interference from the fastener retainer 214. Finally, the arm 226 acts as a spring for the annular portion 219 such that the annular portion 219 may be compressed down towards the part 13 by a drive tool or socket when the fastener 11 is being tightened.

The description of the invention is merely exemplary in nature and variations that do not depart from the gist of the invention are intended to be within the scope of the invention. Such variations are not to be regarded as a departure from the spirit and scope of the invention.

What is claimed is:

1. A device for retaining a fastener in an aperture of a part, the fastener having a flange, the device comprising:
   a first portion having a hole extending therethrough, wherein a diameter of the hole is smaller than a diameter of the flange of the fastener and the diameter of the hole is larger than a largest distance across a head of the fastener;
   a second portion having a first member and a second member;
   a first arm connected at one end to the first portion and connected at an opposite end to the second portion, wherein the first and second members extend perpendicularly from the end of the first arm opposite the end of the first arm connected to the first portion, and the first and second members are at least partially bent at ends thereof to grip a pair of sides of the part;
   a second arm connected at one end thereof to the first portion; and
   wherein the first portion retains the flange of the fastener to the part.

2. The device of claim 1 wherein the first and second members are substantially parallel to the first portion.

3. The device of claim 1 wherein the first arm is angled with respect to both the first portion and the second portion such that the first portion is located on a plane different than the second portion.

4. The device of claim 3 further comprising a third portion connected to the second arm wherein the third portion is on the same plane as the second portion.

5. The device of claim 4 wherein the third portion includes a third member and a fourth member that extend perpendicularly from the end of the second arm opposite the end of the second arm connected to the first portion, wherein the third and fourth members are at least partially bent at ends thereof to grip a pair of sides of the part, and wherein the third and fourth members are substantially parallel to the first portion.

6. The device of claim 5 wherein the second arm is connected to the first portion at an angle with respect to the first arm.

7. The device of claim 1 wherein the first arm and the second arm are bendable and act as springs to allow the first portion to move relative to the fastener and the part.

8. The device of claim 1 wherein the second arm is at least partially angled with respect to the first portion such that an end of the second arm opposite the end connected to the first portion is positioned above the first portion.

9. A fastener retainer assembly located on a part, the fastener retainer assembly comprising:
   a fastener having a head, a shank, a first end portion and a second end portion, wherein the first end portion is at least partially located within the part, the second end portion located at least partially outside the part, and a radial flange located between the first end portion and the second end portion and in contact with the part, wherein the flange has a dimension that is greater than a dimension of the head and a dimension of the shank;

a fastener retainer comprising:

a first portion having a hole extending therethrough, wherein the hole has a dimension that is smaller than the diameter of the flange and the dimension of the hole is larger than a largest distance across the head of the fastener;

a second portion having a first member and a second member; and a first arm connected at one end to the first portion and connected at an opposite end to the second portion, the first arm angled with respect to both the first portion and the second portion such that the first portion is located above the flange of the fastener and the hole is aligned with the head, and wherein the first and second members extend perpendicularly from the end of the first arm opposite the end of the first arm connected to the first portion, and the first and second members are at least partially bent at ends thereof to grip a pair of sides of the part, and a second arm connected at one end thereof to the first portion; and wherein the flange contacts the first portion of the fastener retainer when the first end portion is still at least partially located within the part thereby preventing the fastener from being completely removed from the part.

10. The fastener retainer assembly of claim 9, wherein the first and second members extend perpendicularly from the end of the first arm opposite the end of the first arm connected to the first portion, and wherein the first and second members are at least partially bent at ends thereof to grip a pair of sides of the part.

11. The fastener retainer assembly of claim 10 wherein the first and second members are substantially parallel to the first portion.

12. The fastener retainer assembly of claim 9 wherein the first arm and the second arm are bendable and act as springs to allow the first portion to move relative to the fastener and the part.

13. The fastener retainer assembly of claim 9 wherein the second arm is at least partially angled with respect to the first portion such that an end of the second arm opposite the end connected to the first portion is positioned above the first portion.

14. The fastener retainer assembly of claim 9 further comprising a third portion connected to the second arm at an end opposite the end connected to the first portion, wherein the third portion is configured to engage the part, and wherein the second arm is angled with respect to the first portion such that the third portion is on the same plane as the second portion.

15. The fastener retainer assembly of claim 14 wherein the third portion includes a third member and a fourth member that extend perpendicularly from the end of the second arm opposite the end of the second arm connected to the first portion, wherein the third and fourth members are at least partially bent at ends thereof to grip a pair of sides of the part.

16. The fastener retainer assembly of claim 15 wherein the second arm is connected to the first portion at an angle with respect to the first arm.

17. A fastener retainer assembly located on a part, the fastener retainer assembly comprising:

a fastener having a head, a shank, a first end portion and a second end portion, wherein the first end portion is at least partially located within the part, the second end portion located at least partially outside the part, and a radial flange located between the first end portion and the second end portion and in contact with the part, wherein the flange has a dimension that is greater than a dimension of the head and a dimension of the shank;

a fastener retainer comprising:

a first portion having a hole extending therethrough, wherein the hole has a dimension that is smaller than the diameter of the flange and the dimension of the hole is larger than a largest distance across the head of the fastener;

a second portion having a first member and a second member wherein each member is at least partially bent at ends thereof to grip a pair of sides of the part;

a first arm connected at one end to the first portion and connected at an opposite end to the second portion, the first arm angled with respect to both the first portion and the second portion such that the first portion is located above the flange of the fastener and the hole is aligned with the head;

a second arm connected at one end thereof to the first portion, and a third portion connected to the second arm at an end opposite the end connected to the first portion, wherein the second arm is angled with respect to the first portion such that the third portion is on the same plane as the second portion, and wherein the flange contacts the first portion of the fastener retainer when the first end portion is still at least partially located within the part thereby preventing the fastener from being completely removed from the part.

18. The fastener retainer assembly of claim 17 wherein the first and second members extend perpendicularly from the end of the first arm opposite the end of the first arm connected to the first portion, and wherein the first and second members are at least partially bent at ends thereof to grip a pair of sides of the part.

19. The fastener retainer assembly of claim 18 wherein the first and second members are substantially parallel to the first portion.

20. The fastener retainer assembly of claim 17 wherein the first arm and the second arm are bendable and act as springs to allow the first portion to move relative to the fastener and the part.

21. The fastener retainer assembly of claim 17 wherein the third portion includes a third member and a fourth member that extend perpendicularly from the end of the second arm opposite the end of the second arm connected to the first portion, wherein the third and fourth members are at least partially bent at ends thereof to grip a pair of sides of the part.

22. The fastener retainer assembly of claim 21 wherein the second arm is connected to the first portion at an angle with respect to the first arm.

* * * * *